UNITED STATES PATENT OFFICE.

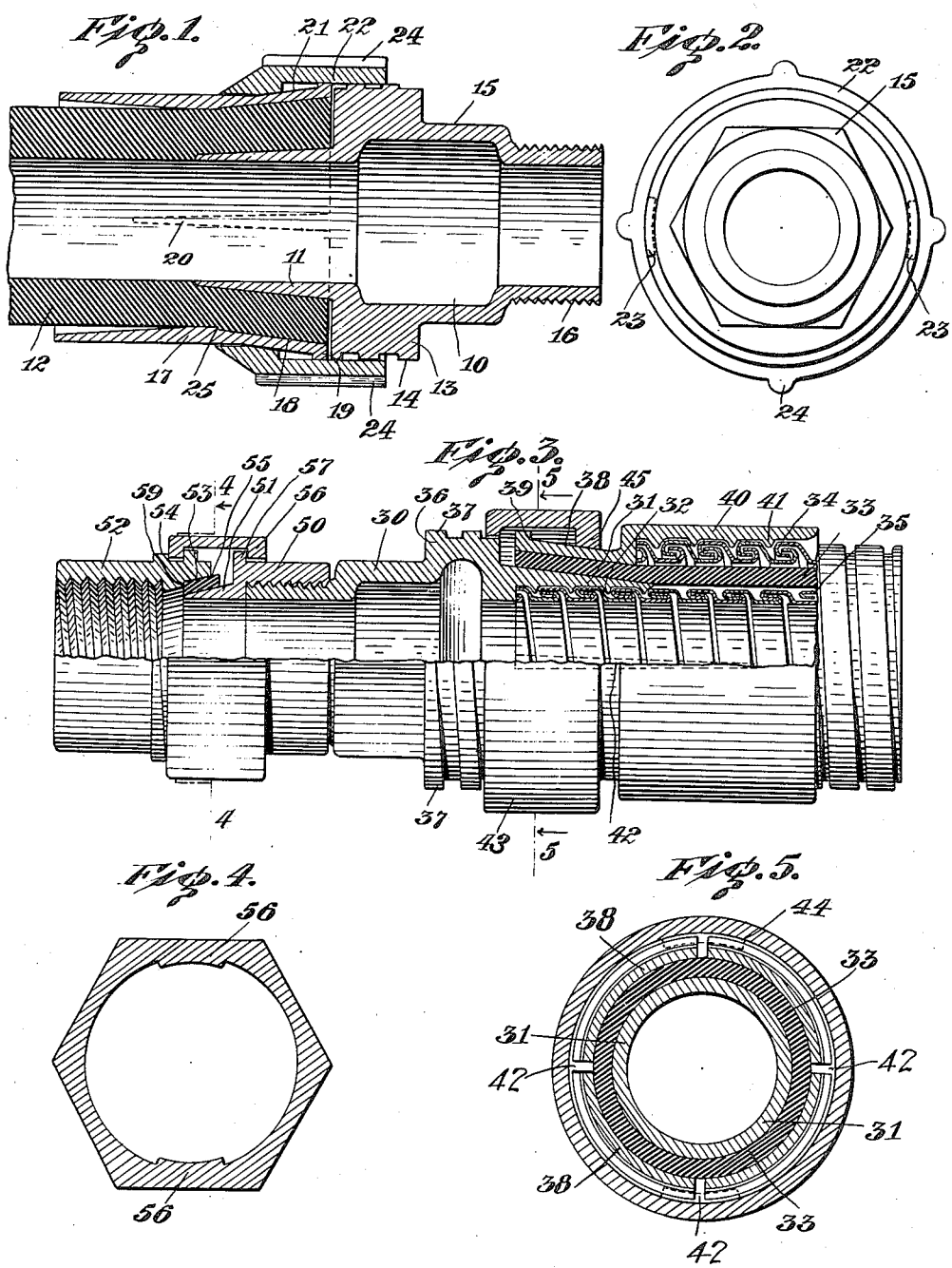

CHARLES H. LAMBKIN, OF NEW YORK, N. Y.

HOSE-COUPLING.

1,175,532.  Specification of Letters Patent.  Patented Mar. 14, 1916.

Application filed January 21, 1913. Serial No. 743,235.

*To all whom it may concern:*

Be it known that I, CHARLES H. LAMBKIN, a citizen of the United States, residing at New York city, in the county of New York, State of New York, have invented certain new and useful Improvements in Hose-Couplings; and I do declare the following to be a full, true, and exact description of the said invention, such as will enable others skilled in the art to which it appertains to make use of the same.

The present invention provides a coupling designed for hose which must resist heavy pressures and a pulling strain, the intent being to secure a tight joint between two sections of hose when coupled and to prevent the hose drawing from the coupling when under tension.

The invention contemplates means for carrying out the foregoing purposes in a simple and efficient manner and particularly, in a manner which will provide for slight inequalities in the diameters of the hose which are supposed to be standard but which, as a matter of fact, vary somewhat.

The invention also contemplates an arrangement by which armored hose, particularly one having an external armor, may be coupled so that the armor is held against longitudinal motion and locked in the coupling.

With these and other objects in view, the invention consists of certain novel features of construction, combination, and arrangement of parts as will be more fully described and pointed out in the appended claims.

In the drawings, Figure 1 represents a longitudinal section through one form of my invention. Fig. 2 represents an end elevation of Fig. 1. Fig. 3 represents a side elevation partly in section of another form of my invention, showing means for coupling an armored hose to a metallic member, and also means for connecting a metallic member to a metallic member. Fig. 4 is a section on line 4—4 of Fig. 3 looking in the direction of the arrow, showing the construction of one of the members, and Fig. 5 is a section on line 5—5 of Fig. 3 looking in the direction of the arrow.

The corresponding parts are referred to both in the drawings and the specification by similar reference characters.

In the drawings, 10 represents generally a main coupling member which is provided with a conical projection 11 which is arranged to fit into the interior of the rubber hose 12 by expanding the latter, the interior of the projection 11 being preferably of the same diameter as the nominal internal diameter of the hose 12. In the form illustrated, the body member 10 is provided with an enlarged portion 13 provided with square double screw threads 14, for a purpose to be hereafter described. The member 10 is also provided with a hexagon portion 15 and, in the particular device shown, with a threaded portion 16 to which any suitable coupling may be attached, such as is shown in Fig. 3.

17 is a hollow member having a tapered internal bore at 18. The member 17 is provided with a flange or rim 19, and also with suitable slits or cuts extending lengthwise of the member 17, as shown particularly at 20 in Fig. 1. As many of these slits 20 may be provided as is required to permit the member 17 to be contracted diametrically when pressure is applied to the exterior of the member 17. As a preferred means for applying this pressure, I make the exterior portion of one end of the member 17 conical or tapered, as shown at 21, and I provide a member or nut 22 having an internal ring arranged to bear against and slide along the tapered portion 21. The nut 22 is provided with threads or sections of threads 23 to engage with the threads 14 on the member 10. The portion of the member 17 to the left of Fig. 1 is cut away to permit the easy entrance of the rubber hose 12. The member 22 is provided with lugs 24 or any other suitable means by which it may be turned by a wrench or other suitable means.

In connecting the hose with the coupling just described, the hose 12 is pushed into the member 17 until approximately flush with the right hand end thereof. The projection 11 is then pushed into the interior of the hose and the member or nut 22 is moved along 17 until its threads or portions of threads engage with the threads 14 on the member 10. When this is done, it will be seen that part of the nut 22 begins to move along the external tapered portion of the member 17, and as the nut 22 is screwed on the member 10, the right hand end of 17 will be compressed on the rubber. At the same time, because of the nature of the contact between the nut and the member 17, there will be a tendency to draw the member 17 toward the member 10, or what amounts to the same thing, to draw the projection 11 into the interior of the hose. In order to insure that in drawing the member 17 toward the member 10, the hose will move with the member 17, I preferably provide a slight ring-like indentation 25 in the interior of the member 17. Instead of this I might provide any roughened or corrugated surface on the interior of the member 17, it being understood that the friction alone between the member 17 and the hose 12 would have a tendency to draw the hose 12 over the projection 11. By reason of this simultaneous compressing and drawing action, I not only insure a firm hold between the hose and the member 10 to prevent longitudinal motion, but I also provide a means for taking up any of the slight variations in the thickness in the walls of the hose 12, since it is obvious that the diametral collapse of the member 17 will bring a pressure around the hose which would not be obtained if the slits 20 were not provided and the hose were slightly smaller than the internal diameter of the member 17. If the nut 22 is screwed up far enough, the end of the hose 12 will be carried against the shoulder of the member 10, which will insure an extremely tight joint, although such end pressure is not necessary in the operation of my device.

Referring now to the modification shown in Fig. 3, which is particularly adapted for the use with either externally or internally armored hose or for both, 30 is the main coupling member having the conical or tapered projection 31 which, in this instance, is provided with internal threads 32 arranged to engage with the grooves of the internal armor illustrated. 33 is the rubber portion of the armored hose having the external armor 34 and the internal armor 35, this armor being of any of the well known forms. 36 is an enlarged portion of the member 30 and 37 represents the double square threads on the exterior of 36.

The member 38 is provided at the left hand end with a conical bore in the same manner as is 17 of Fig. 1, and with a flange 39. The member 38 is also provided with a cylindrical apron or sleeve 40 having internal threads 41 arranged to engage in the grooves of the external armor 34. The member 38 is also provided with a plurality of slots 42 to permit the diametral contraction of the member 38, such slots, in this instance, extending back into the apron 40, so that when the member 38 is compressed diametrally, the threaded portion 40 will also be compressed.

A nut or compression member 43 is provided with threads or portions of threads 44 to engage with the threads 37 and is also provided with an internal ring 45 to engage with an external tapered portion of the member 38.

An inspection of Fig. 3 will show that its method of operation is substantially the same as that described for Fig. 1, so far as the rubber hose itself is concerned, and the method by which it is clamped to the body member 30. In addition, however, it will be seen that the member 40 is compressed on the armor 34. It is to be readily understood that the threads in the apron 40 are preferably made of such size in reference to the external diameter of the armor 34 and the grooves therein as to permit the armor 34 to be readily and freely screwed into the apron 40. It is desirable, however, to take up this looseness when the hose is coupled up and this I accomplish by carrying the slots 42 into the internal threaded portion of the apron 40, so that the threads 41 will be tightened on the armor 34 to hold it rigidly against longitudinal withdrawal. It will be also understood, as in describing Fig. 1, that when the nut 43 is screwed up on the threads 37, the hose 33 is compressed on the conical projection 31 and drawn along such projection. While I have not shown the interior of the member 38 as roughened to grasp the hose, it will be understood that I can provide such device if required.

In the construction of the particular device illustrated in Fig. 3, in order to get the nut 43 into place. it is necessary to collapse the member 38 diametrically sufficiently to allow the ring 45 to be slipped over the flange 39.

The flange 39 in Fig. 3 and 19 in Fig. 1 are provided to prevent the respective nuts being moved up too far and out of contact with the external member of the coupling.

While it is not necessary that the external taper of the projections 11 and 31 and the internal taper bore of the members 17 and 38 should have any specific relation to each other, respectively, I prefer to design them so that when the hose is under compression and coupled, the external and internal tapers will be substantially the same, for by this method I produce a uniform pressure along the entire length of the tapered projection instead of concentrating the pressure at one point, as might be the case if the tapers were designed otherwise.

To the left of Fig. 3, I have shown a novel form of coupling which comprises a member 50 having a conical projection 51, and a second coupling member 52 having an internally tapered portion 53 and an externally threaded portion 54. A compressible gasket of rubber or any other suitable material, 55, is provided between the members 51 and 52 in the manner shown, and a nut 56, engaging with the threads 54 and with a flange 57 on the member 50 is provided to draw the members 50 and 52 together, the tapered portions of each of such members moving along and pressing the gasket 55 to provide a tight joint. In order that the gasket 55 shall not be displaced, I provide the shoulder 59 on the member 52 which serves to hold the gasket in place as the members 52 and 50 are moved together.

It will be understood that many variations may be made of my device without departing from my invention, and that the forms shown in the drawings are merely for purposes of illustration. For instance, while I have provided a nut to draw the two members together, any other suitable form of device may be provided which will draw together the members to be coupled and at the same time compress one of them on the hose. It will be noted that my apparatus is extremely simple, there being no small, loose members to be placed in the interior of the hose, and that it is constructed so as to resist high pressures in an effective manner. It will also be noted that my device may be very cheaply made, and at the same time readily coupled, such ease of coupling being increased by the use of the partial threads 23 on the nut 22.

Having now described my invention, what I claim as new and desire to secure by Letters Patent is as follows:—

1. In a hose coupling, a main coupling member having threads on its exterior and an exteriorly tapered projection arranged to fit into the interior of the hose, a second coupling member having a tapered exterior and adapted to fit over the exterior of the hose when said tapered projection is in the hose, said second member being provided with a plurality of longitudinal slits extending from one end for a portion of its length to form a series of tongues at one end thereof, and a connecting member arranged to fit over said second member and engage with the tapered exterior thereof and having thread projections arranged to engage with the threads on said main member, said main and second coupling members and said connecting member being constructed and arranged to coöperate, when said connecting member is turned, to draw the hose over the tapered portion of said main coupling and to press said tongues inwardly on the hose.

2. In a hose coupling for externally armored hose having a grooved exterior, a main coupling member having an exteriorly tapered projection arranged to fit into the interior of the hose, a second coupling member having a tapered interior portion and arranged to fit over the hose, when said tapered projection is in the hose, said second member being slit to permit diametral contraction thereof, and being provided with an internally threaded portion arranged to engage the grooves in the armor, said slits extending into said internally threaded portion to permit the diametral contraction thereof, means arranged to coöperate with said second member and said main member to draw said second member and the hose toward said main member and, at the same time, to contract said second member diametrically against the hose and the armor.

3. In a hose coupling for externally armored hose having a grooved exterior, a main coupling member having an exteriorly tapered projection arranged to fit into the interior of the hose, a second coupling member having a tapered interior portion and arranged to fit over the hose when said tapered projection is in the hose, said second member having a plurality of longitudinal slits to form a series of tongues at one end thereof and being provided with an internally threaded portion arranged to engage the grooves in the armor, said slits and tongues extending into said internally threaded portion to permit the diametral contraction thereof, and means to compress said tongues against the hose on said exteriorly tapered projection, and simultaneously to compress said tongues against the armor beyond said tapered projections.

CHARLES H. LAMBKIN.

Witnesses:
  GEORGE F. SCULL,
  EMILY M. BRUNS.